(12) United States Patent
James et al.

(10) Patent No.: US 10,217,222 B2
(45) Date of Patent: *Feb. 26, 2019

(54) IMAGE CACHE FOR REPLACING PORTIONS OF IMAGES

(71) Applicant: Google Inc., Mountain View, CA (US)

(72) Inventors: Gavin James, Los Angeles, CA (US); Justin Lewis, Marina del Ray, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,923

(22) Filed: Oct. 24, 2016

(65) Prior Publication Data

US 2017/0103538 A1  Apr. 13, 2017

Related U.S. Application Data

(63) Continuation of application No. 14/523,517, filed on Oct. 24, 2014, now Pat. No. 9,478,056.

(Continued)

(51) Int. Cl.
*G06K 9/00* (2006.01)
*G06T 7/11* (2017.01)
(Continued)

(52) U.S. Cl.
CPC ............ *G06T 7/11* (2017.01); *G06F 17/3028* (2013.01); *G06K 9/00221* (2013.01);
(Continued)

(58) Field of Classification Search
CPC .................. A45D 44/005; G06T 11/60; G06T 2207/10024; G06T 2207/30196
(Continued)

(56) References Cited

U.S. PATENT DOCUMENTS 6,876,364 B2 * 4/2005 Buddemeier ........... G06T 13/40
345/473
7,027,054 B1 * 4/2006 Cheiky ................... G06T 13/40
345/473

(Continued)

FOREIGN PATENT DOCUMENTS

CN        102236890        11/2011
EP         1376475 A2      1/2004
(Continued)

OTHER PUBLICATIONS

European Patent Office, Communication Pursuant to Article 94(3) EPC for European Patent Application No. 14796630.3, dated Jun. 27, 2017, 6 pages.

(Continued)

*Primary Examiner* — Yosef Kassa
(74) *Attorney, Agent, or Firm* — IP Spring

(57) ABSTRACT

Implementations relate to an image cache used for replacing portions of images. In some implementations, a method includes examining a received image and detecting a subject depicted in a subject portion of the received image. The method determines a likelihood that the subject portion will be used as a replacement to be inserted in place of one or more corresponding subject portions in future images examined at a later time. The subject portion, or a reference thereto, is stored in an image cache in response to the determined likelihood being greater than a predetermined threshold. The image cache is available to be searched for the subject portion and other portions of images to replace corresponding portions of future images.

20 Claims, 7 Drawing Sheets

Related U.S. Application Data

(60) Provisional application No. 61/896,648, filed on Oct. 28, 2013.

(51) Int. Cl.
| | |
|---|---|
| *G06T 11/60* | (2006.01) |
| *G06T 5/00* | (2006.01) |
| *G06F 17/30* | (2006.01) |

(52) U.S. Cl.
CPC .......... *G06K 9/00228* (2013.01); *G06T 5/005* (2013.01); *G06T 11/60* (2013.01); *G06K 2009/00328* (2013.01); *G06T 2207/10004* (2013.01); *G06T 2207/30201* (2013.01)

(58) Field of Classification Search
USPC ........ 382/115, 284, 117, 118, 128, 170, 174, 382/190, 209, 218, 224, 278; 340/5.81, 340/5.82, 5.93
See application file for complete search history.

(56) References Cited

U.S. PATENT DOCUMENTS

| | | | | |
|---|---|---|---|---|
| 7,133,155 | B2 * | 11/2006 | Patton | G03B 27/735 358/1.9 |
| 7,206,445 | B2 * | 4/2007 | Takemoto | G06T 11/001 382/162 |
| 7,209,577 | B2 * | 4/2007 | McAlpine | G06T 17/00 345/646 |
| 7,251,054 | B2 | 7/2007 | Takemoto | |
| 7,327,886 | B2 | 2/2008 | Ito | |
| 7,386,799 | B1 * | 6/2008 | Clanton | A63F 13/12 715/753 |
| 7,483,553 | B2 * | 1/2009 | Xu | G06T 11/00 345/473 |
| 7,787,664 | B2 | 8/2010 | Luo et al. | |
| 7,873,189 | B2 | 1/2011 | Jee et al. | |
| 8,085,996 | B2 | 12/2011 | Ogawa | |
| 8,442,341 | B2 * | 5/2013 | Ludwig | G02B 27/46 382/255 |
| 8,472,722 | B2 | 6/2013 | Nayar et al. | |
| 8,553,037 | B2 * | 10/2013 | Smith | G06T 13/40 345/473 |
| 8,581,911 | B2 | 11/2013 | Becker et al. | |
| 8,620,038 | B2 | 12/2013 | Aarabi | |
| 8,624,904 | B1 * | 1/2014 | Koperwas | G06T 13/40 345/473 |
| 8,659,187 | B2 * | 2/2014 | Johnson, Jr. | H02J 3/26 307/105 |
| 2004/0223649 | A1 | 11/2004 | Zacks et al. | |
| 2005/0024516 | A1 | 2/2005 | Fish et al. | |
| 2007/0226314 | A1 | 9/2007 | Eick et al. | |
| 2007/0230794 | A1 | 10/2007 | McAlpine et al. | |
| 2008/0068397 | A1 | 3/2008 | Carey et al. | |
| 2008/0279425 | A1 | 11/2008 | Tang | |
| 2010/0066840 | A1 | 3/2010 | Asukai et al. | |
| 2010/0079491 | A1 | 4/2010 | Nonaka | |
| 2011/0007076 | A1 | 1/2011 | Nielsen et al. | |
| 2011/0058060 | A1 | 3/2011 | Bigioi et al. | |
| 2012/0155773 | A1 | 6/2012 | Tsukamoto et al. | |
| 2013/0051633 | A1 | 2/2013 | Okamoto | |
| 2013/0208167 | A1 | 8/2013 | Chou et al. | |
| 2013/0266195 | A1 | 10/2013 | Shiell et al. | |

FOREIGN PATENT DOCUMENTS

| | | |
|---|---|---|
| EP | 2124186 A1 | 11/2009 |
| EP | 2138979 A1 | 12/2009 |
| WO | 2001/098925 A2 | 12/2001 |
| WO | 2015/065854 A1 | 5/2015 |

OTHER PUBLICATIONS

Groupshot web page for Groupshot application, http:www.groupshot.com, 2012, 1 page.
International Bureau of WIPO, International Preliminary Report on Patentability for International Patent Application No. PCT/US2014/062292, dated May 12, 2016, 7 pages.
"Photo Fuse in Photo Gallery application", Microsoft Corp., http://explore.live.com/windows-live-essentials-photo-gallery-get-started, 2012, 4 pages.
Agarwala, et al., "Interactive Digital Photomontage", ACM Transactions on Graphics, vol. 23, XP055111097; ISSN: 0730-0301, Aug. 2004, 9 pages.
Albuquerque, et al., "Qualitative Portrait Classification", Proc. Vision, Modeling and Visualization (VMZ), 2007, pp. 1-10.
Albuquerque, et al., "The Good, the Bad and the Ugly: Attractive Portraits from Video Sequences", Proc. European Conference on Visual Media Production (CVMP), 2008, pp. 1-4.
Beaver, et al., "Finding a needle in Haystack: Facebook's photo storage", USENIX, XP061010903, Sep. 23, 2010, pp. 1-14.
Bitouk, et al., "Face Swapping: Automatically Replacing Faces in Photographs", ACM Siggraph 2008 Papers on, Siggraph '08, XP055054122; ISBN: 978-1-45-030112-1, Aug. 2008, 8 pages.
Bosch, et al., "Representing Shape with a Spatial Pyramid Kernel", Proc. of the ACM CIVR, 2007, pp. 1-8.
Boykov, et al., "Fast Approximate Energy Minimization via Graph Cuts", IEEE Trans. Pattern Anal. Mach. Intell., Nov. 2011, pp. 1-8.
Brivio, et al., "PhotoCloud: Interactive Remote Exploration of Joint 2D and 3D Datasets Dealing with Hybrid Datasets", XP055168997; URL: http://vcg.isti.cnr.it/Publications/2013/BBTPCS13/2013_photocloud_ieee_preprint.pdf, Mar. 1, 2013, 86 pages.
European Patent Office, International Search Report for International Patent Application No. PCT/US2014/062292, dated May 7, 2015, 4 pages.
European Patent Office, International Search Report for International Patent Application No. PCT/US2013/071762, dated Jun. 12, 2014, 4 pages.
European Patent Office, Written Opinion for International Patent Application No. PCT/US2013/071762, dated Jun. 4, 2015, 5 pages.
European Patent Office, Written Opinion for International Patent Application No. PCT/US2014/062292, dated May 7, 2015, 6 pages.
Fiss, et al., "Candid Portrait Selection from Video", ACM Transactions on Graphics, 30(6), 2011, pp. 1-8.
Freund, et al., "A Decision-theoretic Generalization of On-line Learning and an Application to Boosting", J. Comput. Syst. Sci., 55, Aug. 1997, pp. 1-34.
International Bureau of WIPO, International Preliminary Report on Patentability for International Patent Application No. PCT/US2013/071762, dated Jun. 9, 2015, 6 pages.
Kwatra, , "Graphcut Textures: Image and Video Synthesis Using Graph Cuts", ACM Transactions on Graphics, SIGGRAPH 2003, 22(3), Jul. 2003, pp. 1-10.
Lienhart, et al., "An Extended Set of Haar-like Features for Rapid Object Detection", IEEE ICIP 2002, 2002, pp. 1-4.
Liu, et al., "Gabor Feature Based Classification using the Enhanced Fisher Linear Discriminant Model for Face Recognition", IEEE Trans. Image Processing, 11, 2002, pp. 1-36.
Liu, et al., "Automatic Eye State Recognition and Closedeye Photo Correction", ICPR'08, 2008, pp. 1-4.
Pighin, et al., "Synthesizing Realistic Facial Expressions from Photographs", Proceedings of ACM SIGGRAPH 2006 Courses, Article No. 19, Jul. 2006, pp. 1-10.
Platt, "Probabilistic Outputs for Support Vector Machines and Comparisons to Regularized Likelihood Methods", Advances in Large Margin Classifiers, MIT Press, 1999, pp. 1-11.
Reallusion Inc., "Photo Makeover (iOS App)", https://itunes.apple.com/us/app/photo-makeover/id348610503?mt=8, Dec. 6, 2011, 1 page.
Rowley, et al., "Neural Network-Based Face Detection", IEEE Transactions on Pattern Analysis and Machine Intelligence, 20, Jan. 1998, 149 pages.
Shan, "Smile Detection by Boosting Pixel Differences", IEEE Trans. on Image Processing, vol. 21, No. 1, 2012, pp. 431-436.

(56) References Cited

OTHER PUBLICATIONS

Sun, "Robust and Efficient Eye Location and Its State Detection", Proc. of the ISICA 2009, Springer-Verlag, 2009, pp. 318-326.
USPTO, First Action Interview Office Action for U.S. Appl. No. 13/693,701, dated Oct. 27, 2014, 10 pages.
USPTO, Notice of Allowance for U.S. Appl. No. 14/523,517, dated Jun. 29, 2016, 10 pages.
USPTO, Non-final Office Action for U.S. Appl. No. 13/693,701, dated Aug. 26, 2015, 27 pages.
USPTO, Final Office Action for U.S. Appl. No. 13/693,701, dated Apr. 22, 2015, 41 pages.
USPTO, First Action Interview, Pre-Interview Communication for U.S. Appl. No. 13/693,701, dated Sep. 12, 2014, 6 pages.
USPTO, Non-final Office action for U.S. Appl. No. 14/523,517, dated Dec. 3, 2015, 9 pages.
Viola, "Rapid Object Detection Using a Boosted Cascade of Simple Features", Computer Vision and Pattern Recognition, 2001, Proc. of the 2001 IEEE Computer Society Conference on, vol. 1, 2001, pp. 1-9.
Whitehill, et al., "Toward Practical Smile Detection", IEEE Trans. on Pattern Analysis and Machine Intelligence, 31, 2009, pp. 1-7.
Yang, "Expression Flow for 3D-Aware Face Component Transfer", ACM Transactions on Graphics, 30(4), 2011, pp. 1-10.
Yang, et al., "Facial Expression Editing in Video Using a Temporally Smooth Factorization", Rutgers Univ., Piscataway, NJ; Jun. 16-21, 2012, Jun. 2012, pp. 861-868.
Zhang, et al., "A Survey of Recent Advances in Face Detection", Microsoft Research Technical Report, MSR-TR-2010-66, 2010, pp. 1-17.
EPO, Communication Pursuant to Article 94(3) EPC for European Patent Application No. 14796630.3, dated Feb. 2, 2018, 4 pages.
SIPO, First Office Action (with English translation) for Chinese Patent Application No. 201480059347.1, dated May 3, 2018, 24 pages.
EPO, Communication Pursuant to Article 94(3) EPC for European Patent Application No. 14796630.3, dated Oct. 19, 2018, 7 pages.

* cited by examiner

IMAGE CACHE FOR REPLACING PORTIONS OF IMAGES

CROSS REFERENCE TO RELATED APPLICATIONS

The present application is a continuation of U.S. patent application Ser. No. 14/523,517, filed on 24 Oct. 2014, which claims priority to U.S. Provisional Patent Application No. 61/896,648, filed on 28 Oct. 2013, both of which are hereby incorporated by reference in their entirety.

BACKGROUND

The popularity and convenience of digital cameras as well as the widespread of use of Internet communications have caused digital images to become ubiquitous. For example, user-produced digital photographs are posted to various Internet sites, such as web pages, social networking services, etc. for users and others to view. However, many images such as photographs include various characteristics that are undesirable to the user capturing or creating the image. For example, the user may not like particular facial expressions as captured in a photo, such as a solemn or frowning expression rather than a smiling one. Or, the depiction of a person may have his or her eyes closed in the photo, and the user would like the eyes to be open. In other examples, the user may desire a more clear depiction for a face or other portion of an image.

SUMMARY

Implementations of the present application relate to an image cache used for replacing portions of images. In some implementations, a method includes examining a received image and detecting a subject depicted in a subject portion of the received image. The method determines a likelihood that the subject portion will be used as a replacement to be inserted in place of one or more corresponding subject portions in future images examined at a later time. The subject portion, or a reference thereto, is stored in an image cache in response to the determined likelihood being greater than a predetermined threshold. The image cache is available to be searched for the subject portion and other portions of images to replace corresponding portions of future images.

Various implementations and examples of the method are described. For example, the subject can be a face of a person depicted in the image, and the subject portion can be a face portion of the image, e.g., which can replace corresponding face portions in other images. Other implementations can use other types of image subjects, such as landmarks, objects, etc. The method can further include determining metadata associated with and describing the subject portion, evaluating the subject portion and at least a portion of the metadata to determine the quality of the subject portion, and storing the subject portion in the image cache in response to the quality being above a predetermined quality threshold. For example, if the subject portion is a face portion, the quality can be based at least in part on one or more facial attributes depicted in the face portion, where the facial attributes can include smiling, not-smiling, eyes-open, eyes-closed, etc. In some implementations, storing the subject portion in the image cache can include, in response to the image cache being previously full, comparing the subject portion to previously-cached subject portions in the image cache, and storing the subject portion in the image cache in place of one of the previously-cached subject portions in response to the quality of the face portion being higher than the quality of at least one of the previously-cached subject portions.

Some implementations can determine, in various ways, the likelihood that the face portion will be used as a replacement in future images. For example, the method can check social data related to the user and determine a social connection between the user and a person whose face is depicted in the face portion, where the likelihood is based at least in part on the social connection. The method can check one or more previously-stored images in one or more collections of the user and determine a frequency of appearance of a person whose face is depicted in the face portion, where the likelihood is based at least in part on the frequency of appearance. The method can check for faces and timestamps in one or more previously-stored images in one or more collections of the user, and determine a time of appearance of the person in the face portion, where the likelihood is based on the recency of appearance of the person in the previously-stored images. In some implementations, the image cache can be a client image cache stored on a client device, where the received image is received at the client device from a server maintaining a server image cache that stores a greater amount of subject portions than the client image cache.

In various implementations, the method can further include examining a new image and detecting a new face in the new image, and stitching one of the stored faces of the image cache in place of the new face in the new image if the one of the stored faces is determined to have a higher quality than the new face. The method can include creating a candidate list of stored faces from the image cache, where the stored faces in the candidate list have at least one similar characteristic to the new face, and finding the best face in the candidate list to replace the new face based on the fewest needed transformations to fit the best face to the new image. The method can also include checking whether the new face qualifies to be stored in the image cache, and storing the new face in the image cache if it qualifies to be stored in the cache.

In some implementations, a system can include a storage device storing an image cache, and at least one processor accessing the storage device and operative to perform operations. The operations can include examining a received image and detecting a subject depicted in a subject portion of the received image. The operations determine a likelihood that the subject portion will be used as a replacement to be inserted in place of one or more corresponding subject portions in future images examined at a later time. The subject portion, or a reference thereto, is stored in the image cache if the determined likelihood is greater than a predetermined threshold. The image cache is available to be searched for the subject portion and other portions of images to replace corresponding portions of future images.

Various implementations of the system can further include evaluating the subject portion to determine the quality of the subject portion, where the storing the subject portion in the image cache is in response to the quality being above a predetermined quality threshold. The operation of storing the subject portion in the image cache can include, in response to the image cache being previously full, comparing the subject portion to one or more previously-cached subject portions in the image cache, and storing the subject portion in the image cache in place of one of the previously-cached subject portions in response to the quality of the subject portion being higher than the quality of at least one of the previously-cached subject portions. The subject can be a face of a person depicted in the image, and the subject portion can be a face portion of the image, and the operations can further include examining a new image and detecting a new face depicted in the new image, stitching one of the stored faces of the image cache in place of the new face in the new image if the one of the stored faces is determined to have a higher quality than the new face, checking whether the new face qualifies to be stored in the image cache, and storing the new face in the image cache if the new face qualifies to be stored in the image cache.

In some implementations, a nontransitory computer readable medium has stored thereon program instructions that, when executed by a processor, cause the processor to perform operations including examining a received image and detecting a subject depicted in a subject portion of the received image. The operations include determining a likelihood that the subject portion will be used as a replacement to be inserted in place of one or more corresponding subject portions in future images received at a later time. The operations include storing the subject portion, or a reference thereto, in an image cache in response to the determined likelihood being greater than a predetermined threshold, wherein the image cache is available to be searched for the subject portion and other portions of images to replace corresponding portions of future images in response to receipt of the future images. In various implementations of the computer readable medium, the operation of storing the subject portion in the image cache can include, in response to the image cache being previously full, comparing the subject portion to one or more previously-cached subject portions in the image cache, and storing the subject portion in the image cache in place of one of the previously-cached subject portions in response to the quality of the subject portion being higher than the quality of at least one of the previously-cached subject portions. For example, if the subject is a face of a person depicted in the image, and the subject portion is a face portion of the image, and the operations can further comprise examining a new image and detecting a new face depicted in the new image; stitching one of the stored faces of the image cache in place of the new face in the new image if the one of the stored faces is determined to have a higher quality than the new face; checking whether the new face qualifies to be stored in the image cache, and storing the new face in the image cache if the new face qualifies to be stored in the image cache.

DETAILED DESCRIPTION

Figure 1:
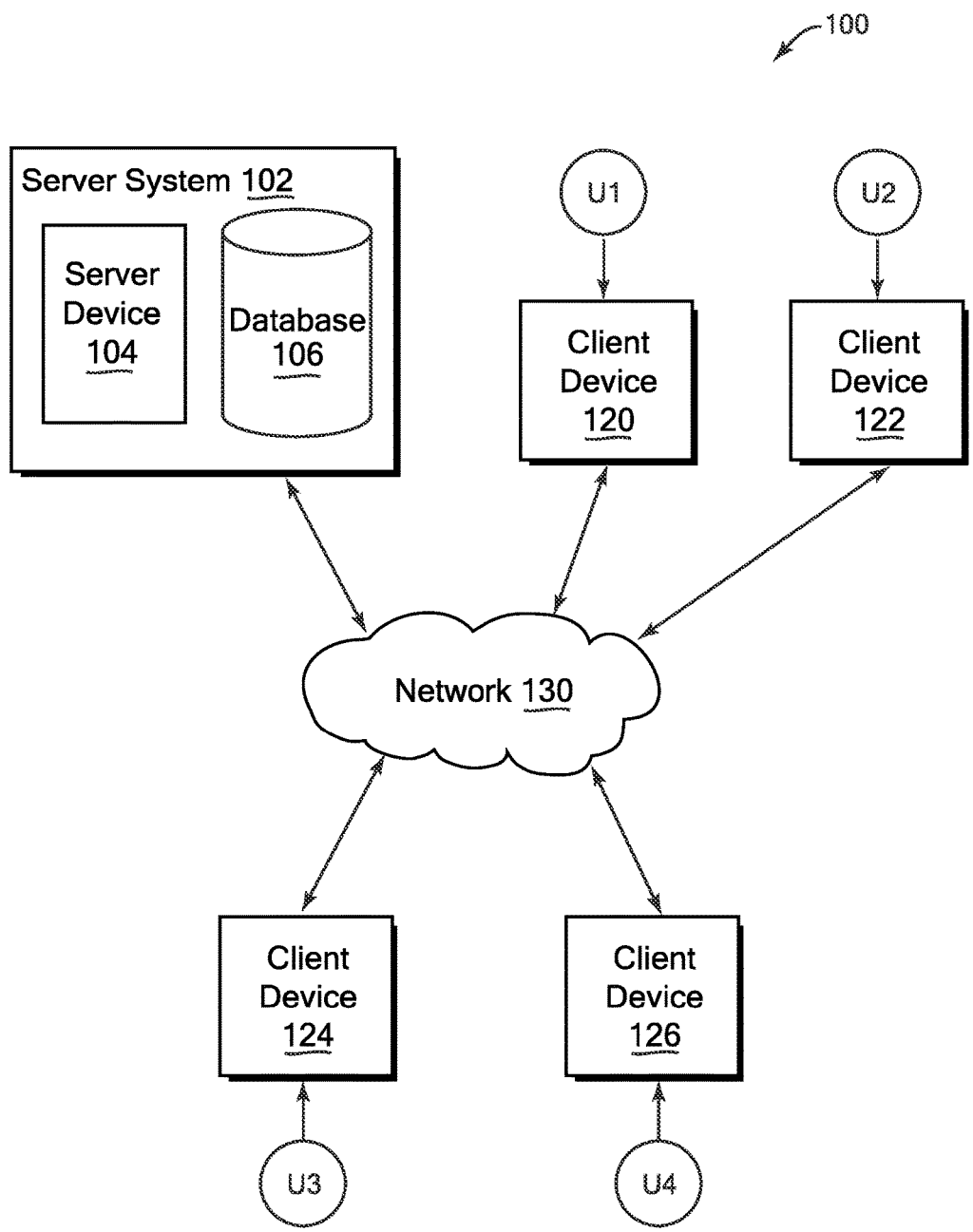
FIG. 1 is a block diagram of an example network environment which may be used for one or more implementations described herein.

One or more implementations described herein relate to an image cache for replacing portions of images. In some implementations, a system can detect a subject depicted in a subject portion of the received image. For example, the subject can be a face of a person depicted in the received image, and the subject portion can be a face portion of the received image. The system determines a likelihood that the face portion will be used as a replacement to be inserted in place of one or more corresponding face portions in future images received at a later time. The system stores the face portion in an image cache if the determined likelihood is greater than a predetermined threshold. This image cache is available to be searched for high quality face portions that can be used to replace corresponding faces in future images received by the system. These and other described features can allow portions of images such as faces to be replaced with higher-quality versions of those portions, such as faces of the same person, obtained from any of a variety of other images and sources, and without requiring extensive processing time or memory.

In some example implementations, the system can cache face portions (or other image subject portions) based on a likelihood that the face portions will be used as replacements to be inserted in place of lower-quality face portions in images received at a later time. In various examples, to determine this likelihood, the system can check social data related to the user and determine a social connection to the user of the person depicted in the face portion, and/or can check previously-stored images in collections of the user and determine a frequency of appearance and/or a recency of appearance of the person depicted in the face portion. The likelihood of use as replacements can be based on one or more of these factors. In addition, the system can maintain an image cache of high quality faces by caching face portions having at least a minimum quality, and can overwrite old face portions in the cache with new face portions that are higher-quality if the cache is full. Face portions for the cache can be obtained from a variety of sources, including servers and client devices.

Such features can allow less desirable faces and other subjects of images to be replaced with more desirable, higher quality corresponding faces or other subjects obtained from other images. For example, an undesirable face in a photograph can be replaced by a higher-quality face of the same person from an older photograph. The image cache described herein can effectively store the most desirable and highest quality image portions of subjects (such as faces) to be used as replacements in future images, and need not store lower quality image portions. The image cache can include images from widely different sources and time frames, and thus is not limited to replacement images captured within a short time frame such as in a burst feature of some cameras. Thus, a larger number of high quality replacement faces or other subjects can be obtained. Furthermore, the cache is efficiently organized to store higher quality image portions that are most likely to be needed as replacements in future photos captured by the device, thus reducing waste in storing unsuitable or seldom-used image portions in the cache. In addition, the image cache is well suited to devices such as portable client devices that capture images, since the image cache can be implemented in a smaller storage space of those devices. Described features allow image portion replacement to be performed on the client device with a limited client-side cache instead of sending images to a server for processing, which can be important for portable client devices prioritizing quick performance of image processing operations and for conservation of battery life on such portable devices. Thus, a technical effect of automatic editing of images as disclosed herein include a reduction in user manual editing of images, thus saving a user time, energy, and resources for obtaining higher quality images. Another technical effect is a higher quality of images resulting from replacing lower quality portions of images with higher quality portions that have been obtained from a wide variety of sources and evaluated for quality. Another technical effect is a reduction in system resources required to maintain and use a cache of image portions well-suited to replace corresponding lower quality portions of images.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, display glasses, personal digital assistant (PDA), media player, game device, wearable device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via one or more network services implemented on server system 102, e.g., a social network service, online store, message service, photo service, web site, or other service, where respective client devices 120, 122, 124, and 126 transmit communications and data to one or more server systems such as system 102, and the server system 102 provides appropriate data to the client devices such that each client device can receive content uploaded to the service via the server system 102. In some examples, a social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat or teleconferencing with other users of the service, etc. As used herein, the term "social networking service" can include a software and/or hardware system that facilitates user interactions, and can include a service implemented on a network system.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

In some implementations, the server system 102 can run application program enabling the image cache features described herein. Furthermore, one or more client devices 120, 122, 124, and 126 can run the same application program and communicate with the server's application program.

Other implementations of features described herein can use any type of system and service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
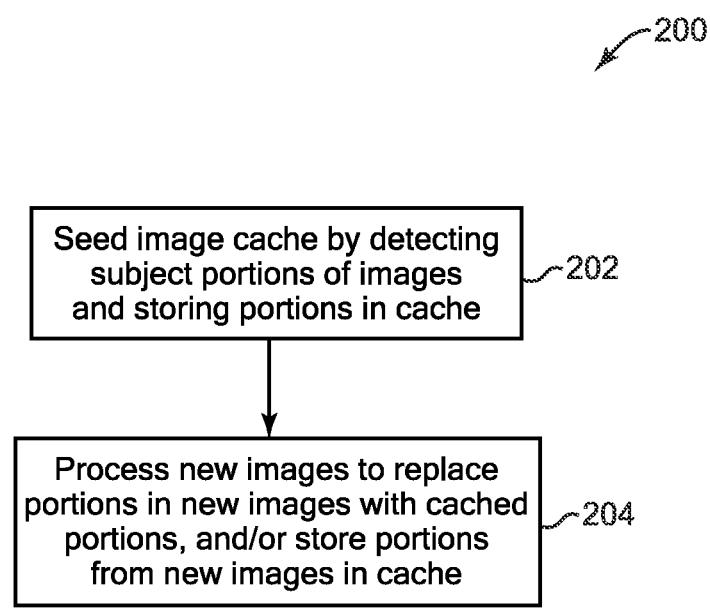
FIG. 2 is a flow diagram illustrating an example method for using an image cache for replacing portions of images, according to some implementations.

FIG. 2 is a flow diagram illustrating one example of a method 200 for using an image cache for replacing portions of images. In some implementations, method 200 can be implemented, for example, on a server system 102 as shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106, client storage, or other storage. In some implementations, different components of one or more servers and/or clients can perform different blocks or other parts of the method 200. Method 200 can be implemented by software, program instructions, or code, which can be implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, these methods can be implemented in hardware (logic gates, etc.), or in a combination of hardware and software. The method 200 can be performed as part of or component of an application running on the system, or as an application or software running in conjunction with other applications and operating system.

In some implementations, the method 200 can be initiated automatically by a device or system. In some implementations, the method 200 can be implemented to process captured images, stored images, received images, etc. In other examples, the method 200 can be periodically performed, or performed based on a particular event such as one or more original images being newly uploaded to or accessible by the device, or a condition specified in custom preferences of one or more users of the device. In one non-limiting example, a camera, cell phone, or other portable client device can perform the method 200. In addition or alternatively, a client device can send captured images to a server over a network, and the server can process the images using method 200. Some implementations can initiate method 200 based on user input. A user may, for example, have selected the initiation of the method 200 (or any of the blocks of method 200) from an interface such as a social networking interface, application interface, or other interface.

In block 202 of method 200, the method seeds an image cache by detecting subject portions of images in accessible images and storing the subject portions in the cache. The images (and portions thereof) can be digital images composed of multiple pixels, for example, and can be accessed from one or more storage devices of the system or otherwise accessible to the system, such as connected storage devices or systems, e.g., a local storage device or storage device connected over a network. In various implementations, the seeding of the face cache can be automatically performed by the method, e.g., when a system or device initializes or becomes capable of the processing described herein, such as upon installation and/or activation of application software. Alternatively, a user of the device performing block 202 can select to initiate block 202.

In some implementations, the image cache is limited in the amount of image portions that it can store, and features described herein can determine whether an image portion should be stored in the cache for not, based on various characteristics of the image. Example details of block 202 are described in greater detail below with respect to FIG. 3.

A "subject portion" of an image, as referred to herein, is a portion of an image that depicts a subject of the image. In several examples described herein, the subject is a face of a person depicted in the image, and the subject portion is a face portion of the image. Likewise, in these examples the image cache is a face cache that stores face portions of images depicting faces of persons. In other implementations, a subject and subject portion can be other types of subjects, and other types of subject portions can be detected and stored in the image cache. For example, subjects such as landmarks, monuments, or other landscape features can be detected in images and stored in the image cache. In another example, the subjects can be recognizable objects such as full figures of persons, particular makes and models of vehicles, animals, devices, structures, landscape objects, or other items.

In block 204, the method processes new images to replace new subject portions in the new images with cached subject portions corresponding to the replaced portions, and/or stores the new portions in the image cache. For example, the method may determine that a face portion in a new image is of low quality, and so finds a face portion in the cache that is of better quality and inserts the cached face "over" (in place of) the new face in the new image. The method can also check whether the new portion should be stored in the image cache. Some example implementations of block 204 are described below with reference to FIG. 6.

Some implementations of method 200 are well suited for use on a client device, such as a portable client device operative to capture images. In some implementations the storage space and thus the image cache on such devices may be limited in storage capacity, and so can benefit from the caching features described herein. In one example, the client device creates an image cache such as a face cache to have desirable, relevant, high-quality faces ready to replace low-quality faces in photographs as those photographs are captured and stored by that client device in the future. In other implementations, one or more features described herein can be used on other devices, such as non-portable client devices and servers.

Figure 3:
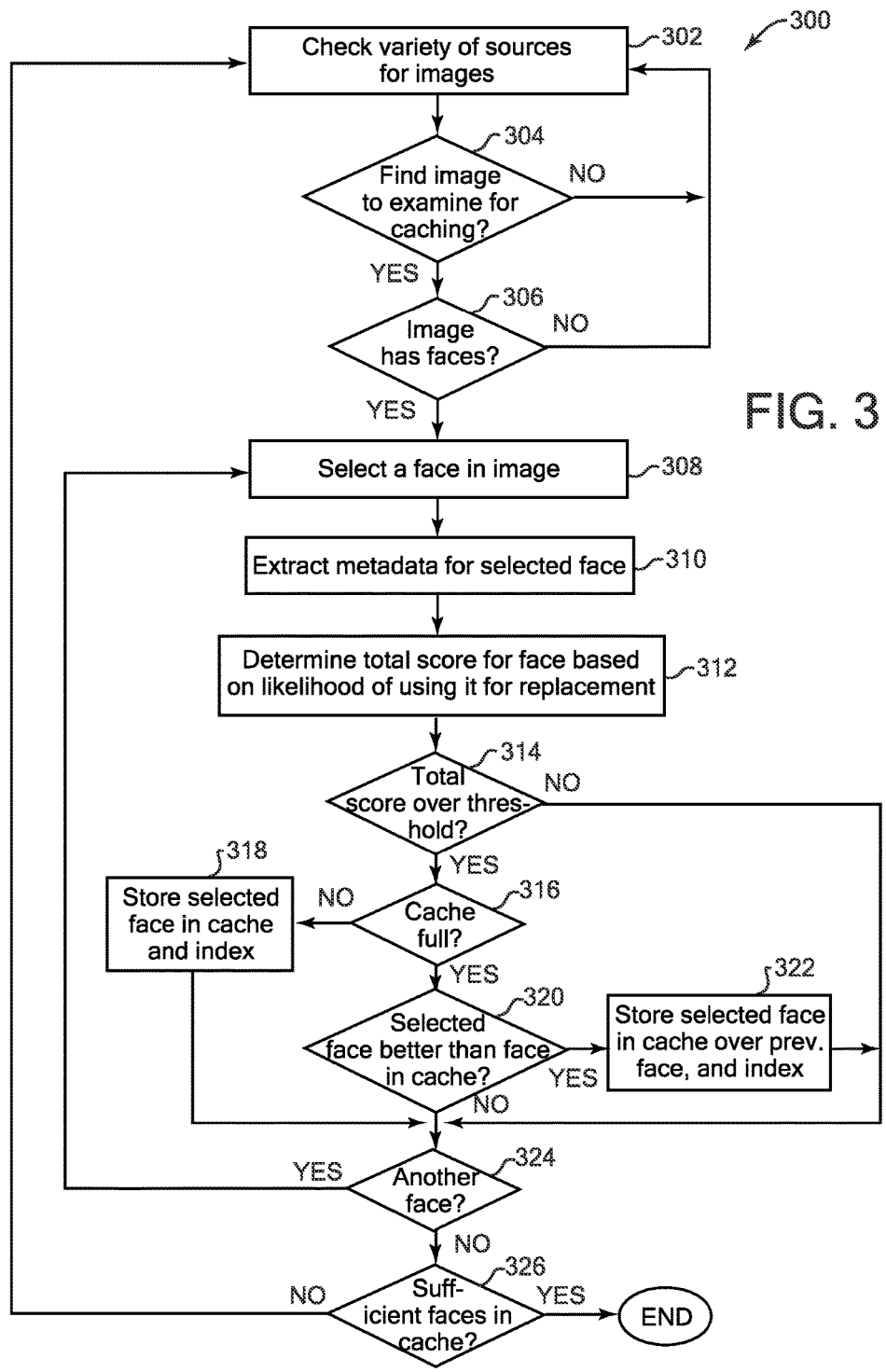
FIG. 3 is a flow diagram illustrating an example method for a block of FIG. 2 for seeding the image cache, according to some implementations.

FIG. 3 is a flow diagram illustrating an example method 300 for seeding the image cache as described above in block 202 of FIG. 2. For explanatory purposes, in this example and in example methods following, the subject image portions are face portions depicting faces of persons in images, and the image cache is described as a face cache. Other types of image subjects can be used with method 300 as indicated elsewhere herein.

In block 302, the method checks a variety of sources for images to examine for detecting faces to store in the face cache. These sources can include local and remote storage. Some examples of sources that the method can check for images are described below with reference to FIG. 4. In other implementations, the method 300 can receive images pushed from connected sources, such as a client device running method 300 and receiving one or more images from a server over a network or other communication link.

In block 304, the method checks whether an image was found to examine for caching. If not, the method returns to block 302 to again check for images. If an image was found, then in block 306, the method checks whether the image depicts one or more faces. For example, well-known face detection techniques and/or face recognition techniques can be used to determine whether there are any faces depicted in the image. If there are no faces, the method returns to block 302.

If there are one or more depicted faces, the method selects one of the faces in the image in block 308. In block 310, the method determines (e.g., extracts or generates) metadata for the selected face portion of the image. The metadata can describe a variety of characteristics of the selected face. For example, the location of the face within the image can be extracted or otherwise determined as coordinate references. Other metadata can include lighting attributes of the face image portion (e.g., brightness, contrast, etc.), sharpness, exposure, color characteristics (e.g., color temperature, whitebalance, color cast, etc.), pixel resolution, and facial geometry. Facial geometry can indicate the view or orientation (pose) of the face, such as an angle of the face with respect to a direct front view, thus indicating the amount that the face is looking to either side of the front view. The metadata can include facial attributes, such as whether the face is smiling, eyes closed or open, mouth open or closed, or other facial attributes. The facial attributes can indicate a degree of the attribute in some implementations, such as ranging from frowning to neutral to smiling for the smile attribute. The metadata also can include a fingerprint that identifies the face as belonging to a particular person, where the fingerprint can be used to organize and index the face according to the person's identity. In some implementations, the fingerprint can be an actual recognized identity of the person belonging to the face, such as a real name, user name, e-mail address, etc. as determined from a database or a service such as a social networking service. In other implementations, the fingerprint need not refer to any real identity of the person, and simply distinguishes this person's faces from other persons' faces, e.g., being generated based on the unique facial structures of a face. In other implementations, block 310 is omitted from method 300, or is performed at a different stage of the method 300 or 200. For example, metadata can be extracted or generated for cached faces at a later stage, such as on the fly when the cached faces are being examined or compared for replacement in method 600 of FIG. 6.

In some cases or implementations, the metadata determined in block 310 is extracted from metadata fields of the image (or other associated storage), e.g., having been previously created or determined and written in the metadata fields by other processes or devices. In other implementations, the method 300 (e.g., block 310) can analyze the selected face and/or its image and determine the metadata. For example, the selected face can be provided with a coordinate position at its approximate center with reference to the image dimensions. Pixel and feature characteristic metadata, e.g., lighting attributes (brightness, contrast, etc.), sharpness, resolution, etc., can be determined by examining the pixel characteristics of pixels and recognized facial features of the selected face and the image. Facial geometry and facial attributes can be determined using facial feature detection methods that can recognize features of a face (e.g., nose, mouth, eyes, forehead, etc.) and determine facial orientation and facial attributes (smiling, frowning, etc.), and the extent of such facial attributes. A fingerprint identity can be determined based on checking for the face's identity in accessible databases, e.g., comparing to known images of identified users available on social networking services or other network services to determine the name of the person. In some implementations, the fingerprint can be generated as a unique identifier without knowing the person's identity, e.g., based on a combination of facial features unique to a particular person, such as distance between facial features such as eyes, nose, and mouth and their positions relative to the borders of the face, the size of eyes, nose, and mouth, the color of eyes and skin, etc.

In block 312, the method determines a total score for the selected face based on a likelihood of using that face for replacing corresponding faces in new, future images examined at a later time. For example, the total score can be a sum of individual scores determined for different multiple signals and/or characteristics that indicate this likelihood. Some examples of determining individual scores and total scores are described below with respect to FIG. 5.

Corresponding faces can be faces having the same person identity, e.g., faces of the same person. Corresponding faces may be visually different in different images due to angle of image capture, conditions of image capture, camera capabilities, etc. Other types of subject portions, such as of depicted objects, can correspond based on their identity if the depicted object appears visually unique, e.g., a famous monument corresponds to that monument in different pictures. Some objects may correspond based on type rather than by particular instance, e.g., different objects having a similar appearance to each other can still correspond. For example, an image subject portion depicting a first apple can correspond to a different subject portion depicting a different, second apple that looks similar to the first apple (e.g., same approximate size, color, texture, etc.).

As referred to herein, "future images" or "new images" are images which are to be examined by block 204 of FIG. 2 to determine whether image portions of those images should be replaced by one or more image portions stored in the image cache. For example, this examination can occur after the current selected face has been evaluated for insertion into the image cache in method 300, thus allowing the current selected face to be eligible to be a replacement for an image portion in the future image as described below with respect to FIG. 6.

In block 314, the method checks whether the total score from block 312 is over a predetermined threshold. This threshold is used to indicate whether the selected face qualifies to be stored in the face cache or not. Thus, if the total score is not over the threshold, the method maintains the current image portions in the face cache without storing the selected face therein, and proceeds to block 324 to check if there are other faces to examine in the image as described below. In some implementations, the threshold used in block 314 can vary at different stages of method 300. For example, during the seeding of the cache the threshold can be lowered to permit image portions to be stored in the cache more easily, and when checking new images for storage in the cache (such as in blocks 606 and 624 of FIG. 6), the threshold can be raised.

If the total score is over the threshold, then the selected face qualifies to be stored in the face cache, and in block 316 the method checks whether the face cache is already full. If not, then there is space in the cache for the selected face, and in block 318, the method stores the selected face and its metadata in the cache and indexes the face according to the fingerprint or other identity of the person belonging to the face. In some implementations, the entire image is stored in the face cache, including the selected face portion. In other implementations, only the face portion of the image corresponding to the selected face is stored in the face cache. In other implementations, portions of faces such as mouths, eyes, noses, etc. can be stored in the cache. Some implementations can additionally or alternatively store in the cache a reference to face image portion(s) or images including the face portion(s), e.g., a pointer to other storage on a connected server and/or client device storing the face portion(s). The method then continues to block 324, where the method checks if there is another face to examine in the image for caching, as detailed below.

In some implementations, the cache can be organized into different buckets based on facial characteristics. For example, front view faces can be grouped in their own bucket, faces oriented 0-30° to the left of center can be grouped in a bucket, faces oriented 0-30° to the right of center can be grouped in a bucket, etc. In such an implementation, the selected face is stored in its appropriate bucket in the cache. Some implementations can favor particular face orientations; for example, the bucket for front view faces can be much larger than all angled or side view buckets since front view faces are more reliably higher-quality replacements.

If the cache is full in block 316, the method continues to block 320, where it checks whether the selected face is better qualified for storage in the cache than one or more faces already stored in the cache. To determine whether the selected face is better qualified, a variety of image characteristics can be examined and compared between the selected face and faces in the cache. For example, the quality of the faces can be compared. Quality characteristics can include pixel resolution, where higher resolution indicates better quality. Quality can also be indicated by such characteristics as lighting or brightness compared to one or more thresholds (e.g., shadows indicate a lower quality), an unrecognizable face, high distortion or blurriness (e.g., over a threshold), undesirable visual attributes (e.g., frowning, eyes closed, etc.), geometric orientation (e.g., front facial view higher is quality than side view), etc.

If the selected face is found to be better qualified then one or more cached faces, then in block 322, the method stores the selected face in the cache over a previously stored face, and indexes the face according to its fingerprint or other identity. The previously stored face that is written over can be the lowest quality face in the cache. In implementations having buckets of different facial characteristics in the cache, the selected face can be written over the lowest quality face within the selected face's bucket. The method then continues to block 324 to check if there are other faces to examine in the image, as described below.

In some implementations, when determining which cached faces to compare to the selected face and to potentially write over, the cached faces of the same person who belongs to the selected face are used. For example, the selected face can first be compared to cached faces of that same person. If there are no cached faces of that person or there are an insufficient number of cached faces of that person, then the selected face can be compared to cached faces of other persons (e.g., a person having a high number of faces stored in the cache). In other implementations, the selected face can be compared to all faces in the face cache.

In block 324, the method checks whether there is another face in the image to examine for caching. If so, the method returns to block 308 to select a different face for processing. If there are no more faces to process in the image at block 324, then in block 326 the method checks whether there are sufficient faces in the cache to enable the cache to operate effectively. The number of sufficient faces can be a predetermined value or range, e.g., based on testing. In some implementations organizing the cache into buckets, each bucket can be required to have a minimum amount of faces to satisfy block 326. If there are not sufficient faces in the cache, the method returns to block 302 to find more images. If there are sufficient faces in the cache, the method ends.

Figure 4:
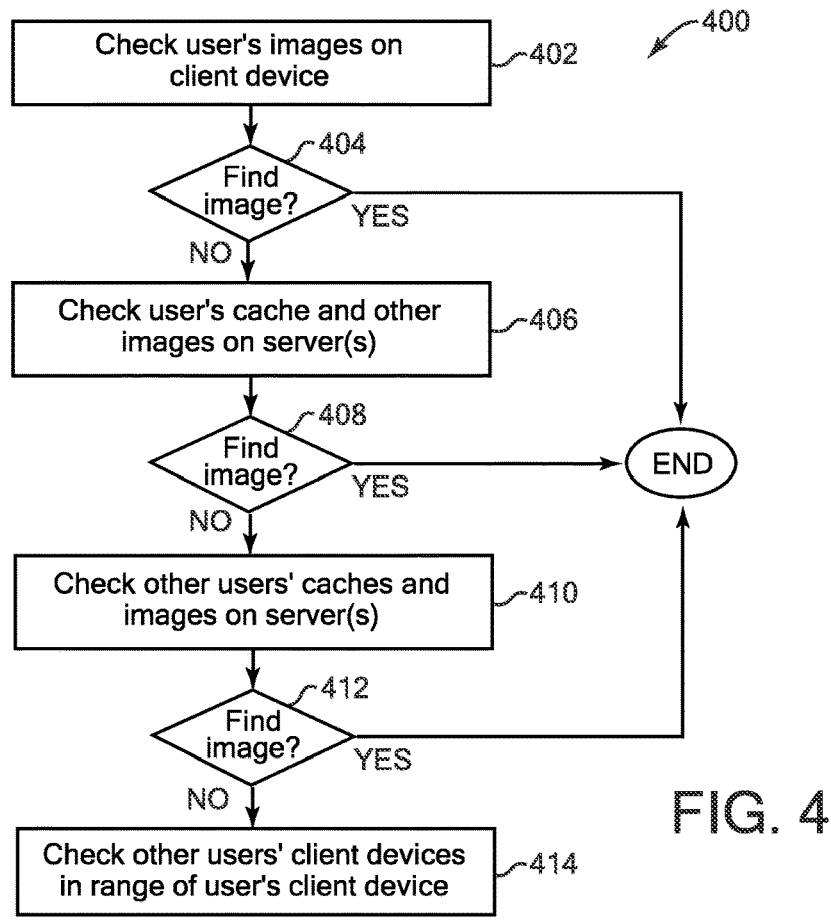
FIG. 4 is a flow diagram illustrating an example method for a block of FIG. 3 for checking a variety of sources for images to examine for faces to cache.

FIG. 4 is a flow diagram illustrating an example method 400 implementing block 302 of FIG. 3, in which a variety of sources are checked for images to examine for faces to cache. In this example, the image processing described herein can take place on a client device operated by user. For example, a portable phone, camera, tablet computer, vehicle computer, wearable device, or other portable client device can seed the face cache and look for images to process. In other implementations, method 400 or similar methods can be performed on other devices, such as a server device, desktop computer, etc. The blocks of method 400 can be performed in any order and/or partially or completely simultaneously.

In some implementations, the method can check all of the images stored at each of the various sources. In other implementations, the method can check subsets of stored images based on various characteristics of the images such as size, color distribution, time stamps or other metadata, and/or based on identified and recognized content depicted in the images, such as persons, faces, or objects. In some implementations, the user can provide or designate one or more characteristics of images that will be examined, and/or can designate the image sources to check.

In block 402, the method checks the user's images stored on the client device. These images can be provided in the user's collection of images and stored on one or more storage devices of the client device, for example in groups such as albums. If the method finds an image to examine as checked in block 404, then method 400 ends and method 300 continues as shown in FIG. 3.

If the method does not find an image, then in block 406 the method checks the user's cache and other images on one or more remotely-connected servers. For example, a face cache can be maintained for the user on a server, such as in an account on a web service, social networking service, home server, or other server. In some implementations, this server face cache can be larger than the face cache on the client device, and thus can store a wide variety of images. In some implementations, the client device can periodically check the user's cache on the server to update the face cache on the client device, e.g., for seeding the face cache as in FIG. 3, and/or to replace or examine faces for the client face cache using new or more up-to-date faces from the server cache. (Alternatively, or in addition, the server can periodically send images to the client device.) The method can also check other images stored on servers and collected by the user in block 406. If the method finds an image to examine as checked in block 408, then method 400 ends and method 300 continues as shown in FIG. 3.

In some implementations, a separate server-based image cache can store its own set of subject portions such as faces, and can be much larger in storage capacity than client based caches, for example. Such server caches can have less strict criteria as to which image portions get cached as compared to client device caches. The client's face cache can be a highest-quality subset of the server face cache, in some implementations. For example, the server can evaluate which faces are to be stored in its face cache using one set of criteria, and determine a subset of its cached faces that are highest quality based on a stricter set of criteria (e.g., using characteristics described herein). The server can send the subset of faces to the client device to also be stored by the client device, or the client device can request the subset of faces from the server. This determination and communication can be performed periodically, each time the server obtains new images, and/or when a relevant condition changes, such as a change in the social connections of the user.

If the method does not find an image, then in block 410 the method checks other users' caches and images on one or more servers. For example, the user may be allowed access to other users' accounts or data collections stored on servers (e.g., with permission from those other users), and these collections can be examined. In some implementations, these other users are likely to be closely socially connected to the user, and therefore may have many images of people known or connected to the user and thus are potentially relevant faces. If the method finds an image to examine as checked in block 412, then method 400 ends and method 300 continues as shown in FIG. 3.

In block 414 the method can check other users' client devices within range of the user's client device. For example, an application program running on the user's device and enabling features described herein may be able to communicate with the same or similar application program running on other users' devices, e.g., via wireless or wired connections, and direct connections or network connections. If allowed by the other users, the user's client device can check the face caches and image collections stored on these other users' client devices and retrieve images of interest. For example, two client devices in range of each other can share face cache images with each other, if appropriate. In some cases, the two client devices sharing face caches can both be owned by the user, e.g., an older user device transmitting cache data to a new device acquired by the user.

Figure 5:
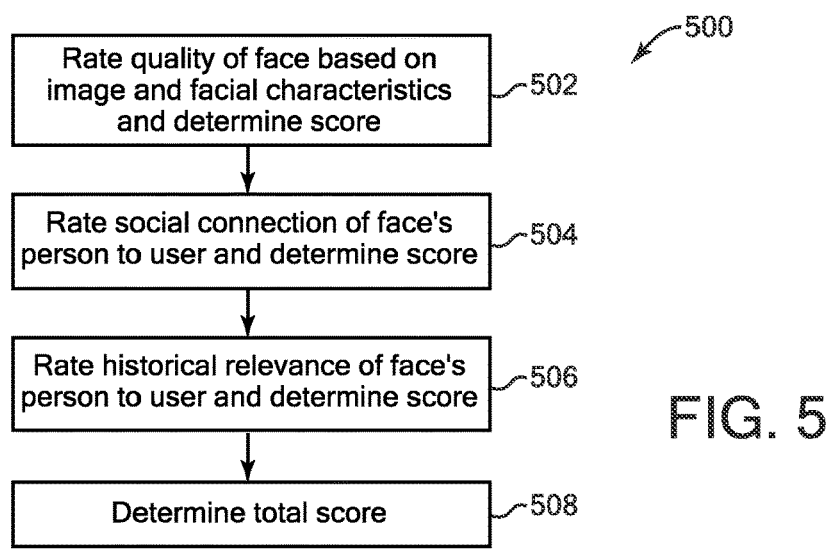
FIG. 5 is a flow diagram illustrating an example method for a block of FIG. 3 for determining a score based on the likelihood of using a face for replacement of corresponding faces.
Figure 6:
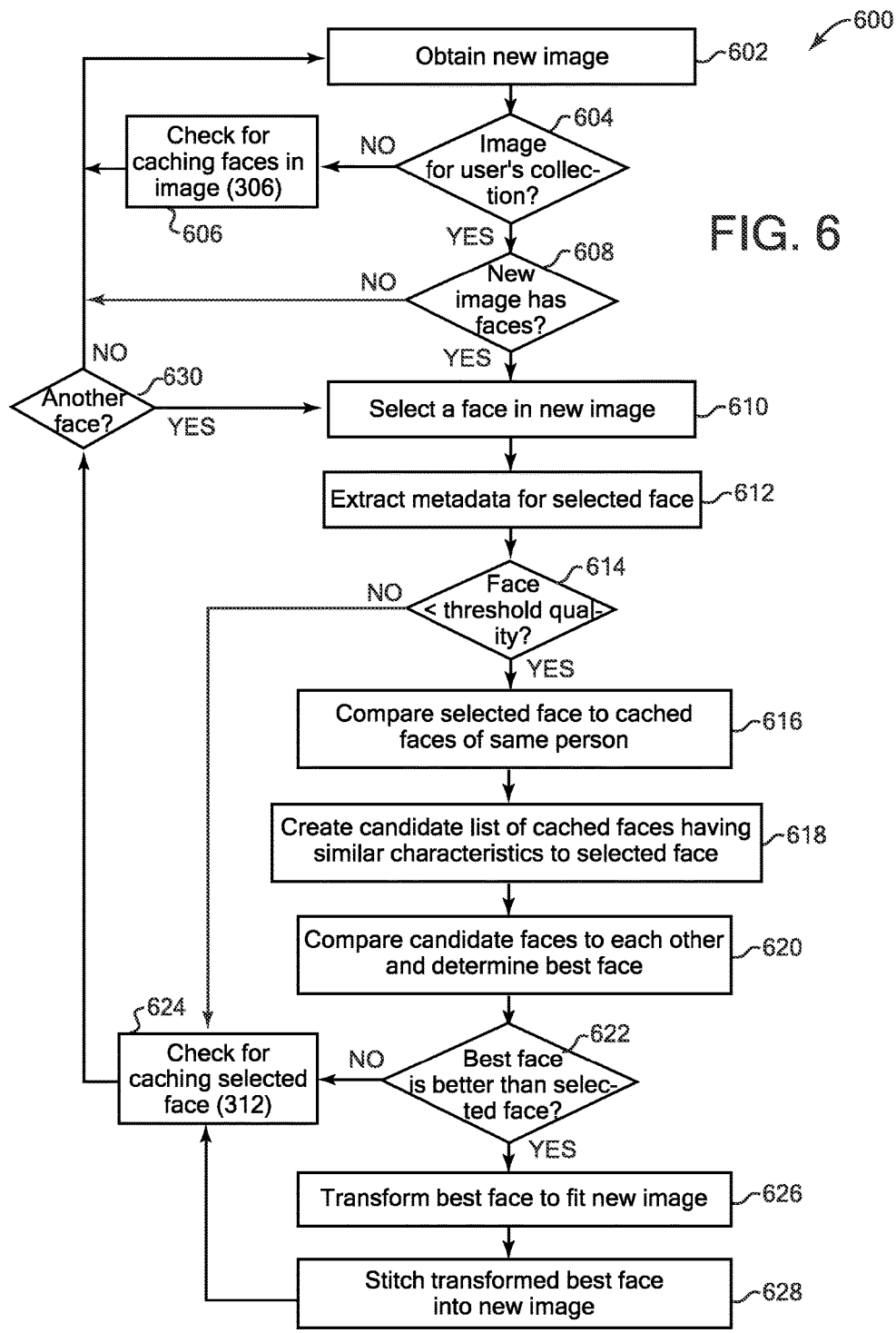
FIG. 6 is a flow diagram illustrating an example method for a block of FIG. 3 for processing new images to replace portions with cached portions, and storing portions of the new images in the image cache.

FIG. 5 is a flow diagram illustrating an example method 500 implementing block 312 of FIG. 3, in which a score is determined for the selected face based on the likelihood of using that face for replacement of corresponding faces in future images examined by method 600 of FIG. 6. For example, in implementations performed on a portable client device, the cached faces on the client device can include those faces determined to be more likely used to replace faces in future photos taken by that client device. Thus the method can approximately predict which persons will more likely appear in images of the user's image collection (e.g., have their picture taken by the client device in the future) and, as a result, more readily cache faces of those persons or prioritize the caching of faces of those persons. In some implementations, future images may also be any other stored images which are to be examined for face replacement from the image cache in method 600 of FIG. 6.

In block 502, the method rates the quality of the selected face based on image and facial characteristics of selected face, and determines a score based on this quality. Higher quality images are more likely to be used as replacements for future images. The quality of the face can be measured using a variety of characteristics. For example, image characteristics can be compared to predetermined thresholds or scales to determine the score. In some implementations, one or more of the image characteristics can be the metadata, or can be derived from the metadata, determined in block 310 as described above. In some implementations, some characteristics can be determined in block 502 or method 500. For example, the image characteristics can include lighting (e.g., dark faces are of lower quality), saturation (e.g., extremely high or low saturation is of lower quality), clarity or blurriness, pixel resolution (e.g., lower resolution is lower quality), size of the selected face relative to the size of the image frame (e.g., the larger the face-to-image ratio, the higher the quality), and other similar characteristics. A face that cannot readily be recognized or identified can be considered lower quality. Quality can also be determined based on facial expression of the selected face, where such expressions as frowning and eyes closed are of lower quality, while smiling and eyes open are of higher quality. Some or all of these different characteristics can be assigned individual scores which are summed to obtain a quality score.

In block 504, the method rates a social connection to the user for the person belonging to the selected face ("associated person"), and determines a score. The social connection can be determined from one or more sources of social data such as user groups, social graph, and user lists of a social networking service or other service involving social contacts and messages, contact lists stored on the user's client device or stored in user-associated accounts on servers, user groups and contact lists of other users, stored historical communication data and call logs showing communications between the user and other users, and other similar social data. The smaller the "social distance" between the associated person and the user (e.g., the stronger or closer that the associated person is socially connected to the user), the greater the score for the selected face. For example, persons socially closer to the user as indicated by the examined connections, messages, and other social data will generally be more likely to have pictures depicting them stored by the user's device in the future, and so their faces should be more likely to be cached in the face cache than persons not as socially connected to the user (greater social distance). In some implementations, to find relevant social connections, the method can determine the real identity of the person in the selected face, e.g., using facial recognition techniques as described above. The method determines the social connection score based on this determined social connection characteristic.

In block 506, the method rates the historical relevance of the person associated with the selected face and determines a score. The historical relevance can be based on examining stored photos and images in the user's collection, and/or stored on the user's devices, to determine which persons are most likely to be the subject in future images collected by the user or examined by the system. Different characteristics of the prior images can be examined and their individual scores summed to find a historical relevance score. In some implementations, historical relevance can be based on time of appearance of the associated person in the user's images, where more recent appearances indicate a more likely appearance of that person in future images. For example, the method can examine metadata timestamps (including time, date, etc.) of the images stored in the user's collection to determine when the images were captured and/or stored by the user on his or her devices. If the person associated with the selected face is depicted in recent images then that person is considered more relevant and more likely to be the subject of future images, and the selected face receives a higher score. In contrast, if a person is only depicted in older images (e.g. captured or stored more than a year ago or other time period, e.g., user-specified time period), then that person is less likely to be the subject of future images and the selected face receives a lower score. In some examples, the magnitude of the score can be related to the amount of time.

Another historical relevance characteristic the method can examine is the frequency of persons appearing in the user's stored images. In general, the greater the number of the user's images that a person appears in, the more likely is that person to appear in future images collected by the user or later examined by the system. For example, if only one or two images in the user's collection depict the associated person, then they are assumed to be less likely to be depicted in future images, and their face should accordingly have less chance to be cached. The method determines a historical relevance score based on one or more of these (previous image) characteristics.

In block 508, the method determines a total score, which can be the sum of the individual scores determined in blocks 502-506. In some implementations, the individual scores can be weighted differently, thus allowing particular characteristics to be more dominant in determining the total score. Some implementations can allow the user to select a desired weighting scheme for the individual scores or characteristics.

In some implementations of method 300 and 500, some blocks can be changed or omitted. For example, block 312 can determine a total score based on the quality of the face portion as in block 502, and omit blocks 506 and 508. In one example, the blocks of method 300 can evaluate a detected face and at least a portion of the metadata to determine a quality of the detected face, and can store the detected face, or a reference thereto, in the face cache in response to the quality being higher than a predetermined threshold. Block 502 can likewise be omitted in other implementations.

FIG. 6 is a flow diagram illustrating an example method 600 for implementing block 204 of FIG. 2, in which new images are processed to replace subject portions of the new images with cached portions, and portions of the new images can be stored in the image cache. In this example, the image subject portions are faces of persons depicted in images. Other types of subjects in image portions can be used with method 600 as indicated previously.

In block 602, the method obtains (e.g., finds, retrieves, or receives) a new image. The new image can be a "future image" from the perspective of method 300. For example, if the method is being implemented on a portable client device, the new image may be the result of the user taking a photo with the client device. In other cases, the new image may be received over a communications channel and/or network at the device performing method 300. In some cases, the device may have found an image at another source, such as a server or other client device, and the user or the device decides to retrieve the image. In some cases, the new image may be retrieved as part of other data, such as a document, an e-mail or text message, etc.

In block 604, the method checks whether the new image is to become part of the user's image collection. For example, pictures captured by the user or images selected to be downloaded to the device by the user can be considered images that the user desires to become part of his or her collection. Images that are received incidentally or as part of other data may not be desired by the user to become part of the user's collection, and thus can be omitted from processing for possible replacement faces according to the current method. In some implementations, if the new image is ambiguous as to its status, the user can be prompted as to whether the image should become part of the user's collection. Other conditions can also be defined by the user or system to cause the new image to be omitted from the processing of method 600, e.g., images from particular sources, depicting particular subject matter, etc. If the image is not to become part of the user's collection (or is otherwise not to be processed), then the method does not process this image for face replacement and continues to block 606. In block 606, the method checks whether to cache faces in the new image to the face cache. For example, the method can start at block 306 of FIG. 3 to check for faces and process the image in method 300. This allows face portions of images that are not to be processed for possible face replacement to potentially contribute high quality face portions to the face cache. The method then returns to block 602.

If the image is to be stored in the user's collection (or is otherwise qualified), then it can be processed for face replacement. In block 608, the method examines the new image and checks whether the new image depicts one or more faces. As described in reference to FIG. 3, face detection or face recognition techniques can be used. If the new image has no faces, the method returns to block 602 to find or receive another image. If the new image depicts one or more faces, the method selects a face in the new image in block 610. In block 612, the method extracts metadata for the selected face, similarly as in method 300 of FIG. 3.

In block 614, the method checks whether the selected face has less than a threshold quality. The quality of the selected face can be measured by examining one or more characteristics, such as lighting, saturation, distortion, recognizability, resolution, etc., similar to quality measures described above. If the selected face has greater than the predetermined threshold quality, then it is considered a high enough quality to not need replacement by a face from the face cache. Since the selected face has a high quality (e.g., over the threshold quality), the method continues to block 624 to check whether the selected face should be cached in the face cache. For example, the method can go to block 312 of FIG. 3 to determine whether the selected face should be cached and perform method 300. After block 624, the method can then continue to block 630 to check if there is another face to examine in the new image. If so, the method returns to block 610 to select another face. If not, the method returns to block 602. In an alternate implementation, block 614 can be omitted and the cache is always checked as described below.

If the selected face has less than a predetermined threshold quality, then it is considered potentially suitable for replacement by a face from the face cache. The method continues to block 616, in which the selected face is compared to cached faces of the same person. In some implementations, the cached faces that are compared can be found by examining (or deriving) the identity or fingerprint of the selected face and finding the same identity or fingerprint in the index to the cache, which points to all the cached faces having that same identity, e.g., all the cached faces of the same person. In block 618, the method creates a candidate list of cached faces that have similar properties to the selected face. For example, the method can look for cached faces having similar lighting and geometric orientation to the selected face. This can allow particular cached faces to replace the selected face more easily and convincingly, since they have similar characteristics.

In block 620, the method compares candidate faces to each other and determines a best face for replacement from the candidates faces. Selecting one of the candidate faces as the best face can be performed using a variety of techniques. For example, the method can examine several different characteristics of the candidate faces and determine scores for each candidate for each of the characteristics. Some characteristics can be weighted higher than others, and thus influence the score more strongly. In some examples, face attributes can be examined, such as smiling vs. not-smiling (e.g., neutral or frowning) scale, eyes open vs. eyes closed scale, etc., where for each of these scales, one extreme (e.g., smiling and eyes open) is scored higher and the other extreme (e.g., frowning and eyes closed) is scored lower. In some implementations, user preferences can indicate which facial attributes score higher and which facial attributes score lower (such as facial hair vs. no facial hair, glasses vs. no glasses, etc.).

Each candidate face can be scored also based on the similarity of particular characteristics to the selected face. For example, a candidate face requiring fewer transformations to become similar to the selected face (and or image area surrounding the selected face) can be scored higher. In some examples, a candidate's face closer in its geometric orientation (e.g., face angle) can score higher, as can a candidate face having similar lighting characteristics, color characteristics, and so on.

In block 622, the method checks whether the best face found in the candidate list is better than the selected face. For example, the quality of each of these faces can be estimated as a score similarly as described above, and the quality score of the best face checked if it is greater than the quality score of the selected face. If not, the method does not replace the selected face and continues to block 624, where it checks whether the selected face should be cached in the face cache, e.g. by continuing to block 312 of FIG. 3. The method then returns to block 602. In some implementations, block 622 is omitted and the selected face can be compared with all the candidates faces in block 620.

If the best face is better than the selected face, it replaces the selected face. In block 626, the method transforms the best face to fit the new image. For example, color and brightness corrections can be used on the best face to match the selected face. Face touch-up filters can be used on the best face, such as red eye reduction, skin smoothing or other blurring, etc. to match the selected face. Some implementations can slightly change the angle of the best face to fit the angle of the selected face. For example, three-dimensional or two-dimensional transforms can be applied to determine how to rotate or distort the best face to match the selected face.

In block 628, the transformed best face is stitched or "baked" (inserted) into the new image in place of the selected face. Any of a variety of techniques can be used. For example, some implementations can match facial landmark features or points (centers of eyes, center of nose, eyebrow endpoints, mouth endpoints, etc.) of the best face and the new face being replaced, to properly align the best face and the image. The edges of the best face and the portion of the image surrounding the selected can be blended or smoothed together to remove any discontinuities or seams between the best face and the surrounding image pixels. Gradient domain compositing can move the details and texture from the image to the best face, and can closely match the color and lighting of the best face to the image. The method then continues to block 624, where the method checks if the selected face can be cached in the face cache, e.g. starting at block 312 of FIG. 3. The method then continues to block 630 to check whether there is another face in the new image. If so, the method returns to block 610 to select another face in the new image. If all faces in the image have been checked at block 630, the method returns to block 602.

It should be noted that various operations and methods described above estimate or compare the quality of image portions. In some implementations, the characteristics, thresholds, values, and/or scales that define quality can be set or altered by the user, e.g., in preferences or settings.

The above methods 200-600 can be implemented in any of a variety of specific ways. For example, in some implementations, instead of stitching each replacement face one at a time in block 628, all cached replacement faces can first be found for all the faces in the image, and then all these replacement faces are stitched into the image in the same step or stage. In some alternative implementations, instead of transforming the best face to appear similar to the new image in block 626, the image can be transformed to appear similar to the best face (e.g., this may be most functional when only one face is depicted in the new image).

Various alternative implementations of the above features can be employed. In some implementations, instead of storing, selecting and processing entire faces as described above, portions of faces can be processed, such as mouths, noses, pairs of eyes, eyebrows, etc. Each type of face portion can be stored in the image cache in its own category or buckets. Instead of replacing an entire face, as described above, these portions of faces can be individually replaced if determined to be desirable.

In some implementations, other types of image subjects besides (or in addition to) faces can be processed. For example, landmarks or monuments can be recognized in images. If these landmark images are of low quality, they can be replaced with better quality images of those landmarks from the image cache similarly as described above for faces. The cached images can be older or pristine images of the landmarks from the user's collection and/or from other sources such as web sites, reference data, etc. Likewise, objects or items depicted in images can be similarly processed.

Various blocks and operations of methods 200-600 can be performed in a different order than shown and/or at least partially simultaneously, where appropriate. For example, some implementations can perform blocks 202 and 204 at least partially simultaneously. In some implementations, operations can occur multiple times, in a different order, and/or at different times in the methods. In some implementations, the methods can be implemented, for example, on a server system 102 as shown in FIG. 1. In some implementations, one or more client devices can perform one or more blocks instead of or in addition to a server system performing those blocks.

Figure 7A:
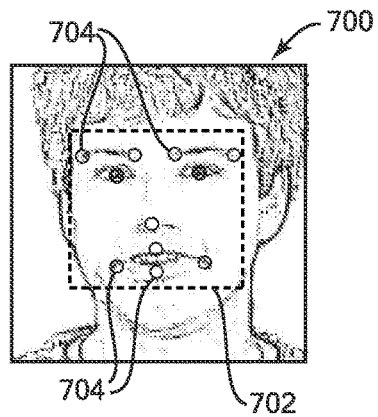
FIGS. 7A-7C are diagrammatic illustrations of example image cache and image processed using method described herein.
Figure 7B:
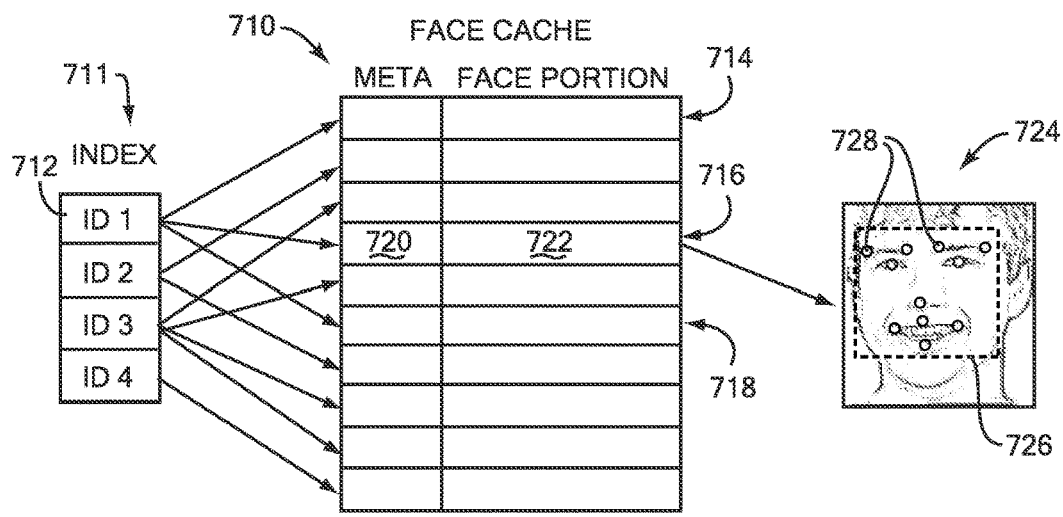
Figure 7C:
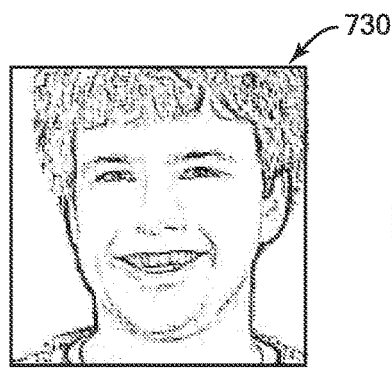

FIGS. 7A-C are diagrammatic illustrations of examples showing one or more features of the implementations described above to store face portions of an image in an image cache and replace face portions in new images with faces from the image cache.

In FIG. 7A, a new image 700 is shown, which has been received by a device implementing features described herein. In some implementations or applications, image 700 can be captured by a camera at a client device and processed by features described herein without being displayed. This processing can occur on the capturing device, on a different or receiving client device, and/or on a server device. In other implementations, the new image 700 can be received from another source (e.g., memory or other storage, etc.) and processed by a client or server device. In some implementations, the new image 700 can be displayed on a display device, e.g., of a client device 120, 122, 124, and/or 126 of FIG. 1, or a server system 102 in some implementations.

In this example, new image 700 depicts a face portion 702 of a person and is to be processed according to features described herein. The face portion 702 can be detected by method 600 and is processed to see if it should be replaced by a face from the face cache. In some examples, face portion 702 can be defined by a bounding box as shown in dashed lines in FIG. 7A. Some implementations can define the face portion 702 based on landmark points 704, such as the endpoints of eyebrows, center points of eyes, points defining the boundaries of the mouth, and the center of the nose. In this example, the face portion 702 is found to have a lower quality, e.g., at least due to having a frowning or non-smiling face in this example, and so is processed for replacement.

FIG. 7B shows a face cache 710 which can be implemented in available storage devices of a system and which has been previously seeded with face portions from other images. Each entry of the face cache can include metadata and an image face portion depicting a person's face. As described in FIG. 6, candidate faces from the cache can be located based on an index 711 which stores identifiers of persons whose faces are stored in the cache. For example, an identifier can be determined from the new image 700 based on face recognition or other technique. The identifier of the image 700 can be matched to one of the identifiers in index 711. In this example, the identifier determined from new image 700 matches the person identified as "ID 1" in index entry 712. Index entry 712 points to entries 714, 716, and 718 of the face cache 710 which each stores a different face of that person derived from previously-stored images.

As described in FIG. 6, the face portions in entries 714, 716, and 718 can be candidate faces which are compared to the new image 700 and to each other to find the best matching face in the face cache 710. In this example, entry 716 has been found to have the best face matching the face portion 702 of the image 700, where entry 716 is described by metadata 720 and face portion entry 722. In one example, entry 716 may be the best face because it has a smiling facial attribute and because it has a similar facial angle and geometry to the face portion 702. The face portion entry 722 can be stored as an entire image 724 in the cache in some implementations, and a face portion 726 of the image 724 can be defined as shown with a bounding box. In other implementations, the face portion 726 is stored in entry 722 of the face cache 710 without the rest of the image 724. As with image 700, landmark points 728 can be defined for facial features in the face portion 726.

In FIG. 7C, a resulting image 730 is shown. Image 730 has had the best face portion 726 stitched into the image 700, where the stitched face portion has been transformed to have similar characteristics to image 700, including being resized, having its color matched, and so on, and aligned with the previous face portion 722. The seam or boundary between the inserted face portion 726 and the surrounding portion of the image 700 has been blended to look smooth. As in FIG. 6, image 702 can also be processed to determine if its depicted face portion should be stored in the cache 710.

Figure 8:
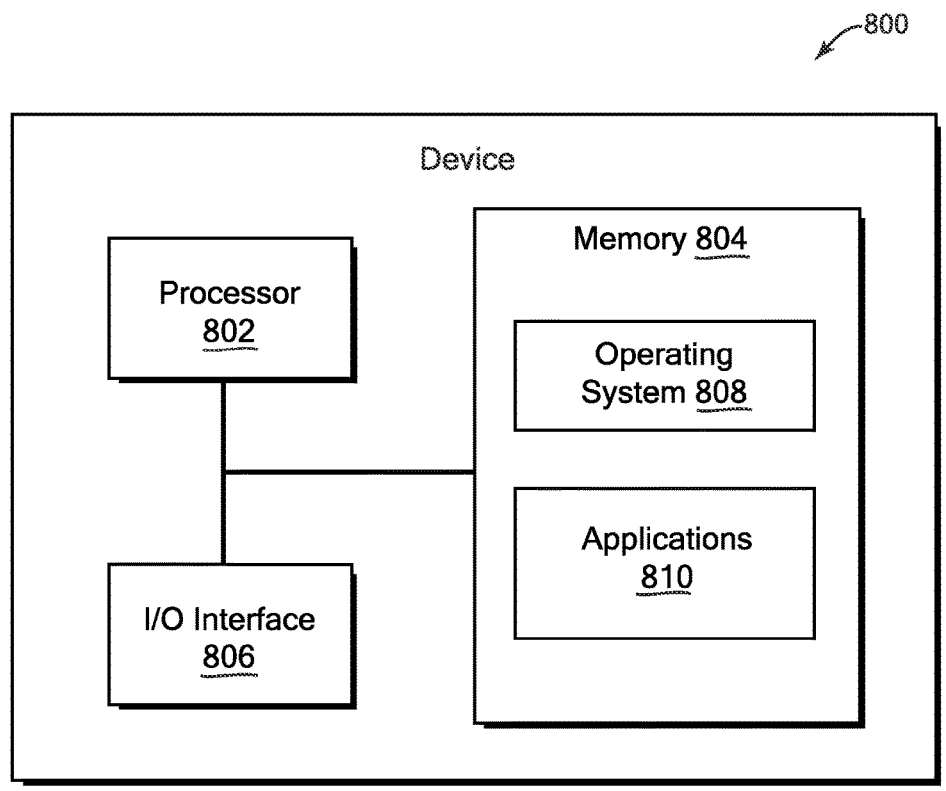
FIG. 8 is a block diagram of an example device which may be used for one or more implementations described herein.

FIG. 8 is a block diagram of an example device 800 which may be used to implement one or more features described herein. In one example, device 800 may be used to implement a client device, such as any of client devices 120-126 shown in FIG. 1, and perform appropriate method implementations described herein. Device 800 can be any suitable computer system, server, or other electronic or hardware device. For example, the device 800 can be a portable computer, electronic device (portable device, cell phone, smart phone, tablet computer, television, TV set top box, personal digital assistant (PDA), media player, game device, wearable device, etc.), mainframe computer, desktop computer, workstation, etc. In some implementations, device 800 includes a processor 802, a memory 804, and input/output (I/O) interface 806.

Processor 802 can be one or more processors or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the device 800 by the processor 802, including an operating system 808 and one or more applications engines 810 such as a communication engine, display engine, social networking engine, etc. In some implementations, the applications engines 810 can include instructions that enable processor 802 to perform the functions described herein, e.g., some or all of the methods of FIGS. 2-6. Any of software in memory 804 can alternatively be stored on any other suitable storage location or computer-readable medium. In addition, memory 804 (and/or other connected storage device(s)) can store the image cache, images, metadata, and other data and instructions used in the features described herein. Memory 804 and any other type of storage (magnetic disk, optical disk, magnetic tape, or other tangible media) can be considered "storage devices" or "storage."

I/O interface 806 can provide functions to enable interfacing the device 800 with other systems and devices. The I/O interface can be connected to network communication devices, as well as to input and output devices such as a camera for capturing images or video, microphone for capturing sound, a audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

For ease of illustration, FIG. 6 shows one block for each of processor 802, memory 804, I/O interface 806, and software blocks 808 and 810. These blocks may represent one or more processors or processing circuitries, operating systems, memories, I/O interfaces, applications, and/or software modules. In other implementations, server device 800 may not have all of the components shown and/or may have other elements including other types of elements instead of, or in addition to, those shown herein. While device 800 is described as performing steps or blocks in some implementations herein, any suitable component or combination of components of device 800 or system 100 or similar system, or any suitable processor or processors associated with such a system, may perform the steps described.

A server device can also implement and/or be used with features described herein, such as server device 104 shown in FIG. 1. Example server devices can include some similar components as the device 800, such as processor(s) 802, memory 804, and I/O interface 806. An operating system, software and applications suitable for the server device can be provided in memory and used by the processor, such as server communication application software. Interface 806 can be connected to a variety of components, such as network communication devices, storage devices such as memory and/or database 106, and input/output devices. In some implementations, the I/O interface can connect to interface devices such as input devices (keyboard, pointing device, touchscreen, microphone, camera, scanner, etc.) and output devices (display device, speaker devices, printer, motor, etc.).

Although the description has been described with respect to particular implementations thereof, these particular implementations are merely illustrative, and not restrictive. Concepts illustrated in the examples may be applied to other examples and implementations.

In situations in which the systems and methods discussed here may collect personal information about users, or may make use of personal information, users may be provided with an opportunity to control whether programs or features collect user information (e.g., images depicting the user, information about a user's social network, user identity, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A computer-implemented method comprising:
    identifying a subject face of an image, wherein the subject face depicts a subject;
    comparing the subject face of the image with one or more cached faces of one or more cached images stored in an image cache;
    selecting a particular cached face of the one or more cached faces to replace the subject face, wherein the selecting comprises finding the particular cached face from the one or more cached faces in the image cache based on a number of transformations to be applied to fit the particular cached face to the image being lower than a respective number of transformations to be applied to fit other faces of the one or more cached faces to the image; and
    modifying the image by stitching the particular cached face in the image to replace the subject face.

2. The computer-implemented method of claim 1,
    wherein comparing the subject face of the image with the one or more cached faces includes assigning respective scores to one or more visual image characteristics of the one or more cached faces based on comparisons of the one or more visual characteristics of the one or more cached faces with one or more corresponding visual image characteristics of the subject face, wherein the one or more visual characteristics include one or more of lighting characteristics or color characteristics, and
    wherein selecting the particular cached face is further based on the respective scores.

3. The computer-implemented method of claim 1, wherein selecting the particular cached face comprises:
    based on the comparing, determining a candidate list of candidate cached faces;
    assigning a score to each candidate cached face in the candidate list of candidate cached faces; and
    identifying the particular cached face based on the score.

4. The computer-implemented method of claim 1, further comprising assigning a respective score to one or more image characteristics of the subject face of the image and one or more image characteristics of the one or more cached faces stored in the image cache,
    wherein the selecting the particular cached face is in response to determining that the particular cached face has at least one image characteristic associated with a better score than a score associated with a corresponding image characteristic of the subject face of the image.

5. The computer-implemented method of claim 1 further comprising:
    determining whether the subject face qualifies to be stored in the image cache based on a comparison of the subject face to the one or more cached faces; and
    storing the subject face in the image cache if the subject face qualifies to be stored in the image cache.

6. The computer-implemented method of claim 1, further comprising:
    determining a candidate list of one or more candidate cached faces from the image cache, wherein determining the candidate list includes determining that the one or more candidate cached faces have at least one similar characteristic to the subject face, wherein selecting the particular cached face includes selecting the particular cached face from the one or more candidate cached faces of the candidate list.

7. The computer-implemented method of claim 1, further comprising determining that the subject face does not satisfy a quality threshold based on examination of one or more particular characteristics of the image, wherein selecting the particular cached face and stitching the particular cached face are performed in response to determining that the subject face does not satisfy the quality threshold.

8. The computer-implemented method of claim 7 wherein the one or more particular characteristics of the image include one or more facial attributes depicted in the subject face, the facial attributes including smiling mouth or eyes-open.

9. The computer-implemented method of claim 1, wherein stitching the particular cached face comprises one or more of:
    aligning the subject face and the particular cached face based on facial landmark points; or
    performing gradient domain compositing.

10. The computer-implemented method of claim 1, further comprising, prior to the stitching, transforming the particular cached face to fit the image, wherein the transforming comprises one or more of:
    performing one or more of color correction or brightness correction on the particular cached face;
    applying a face touch-up filter on the particular cached face; or
    changing an angle of the particular cached face.

11. A system comprising:
    a storage device with an image cache stored thereon; and
    one or more processors configured to access the storage device and to perform operations including:
        identifying a subject face of an image, wherein the subject face depicts a subject;
        comparing the subject face of the image with one or more cached faces stored in the image cache;

selecting a particular cached face of the one or more cached faces, wherein the selecting is based on the comparing and is based on a number of transformations to be applied to fit the particular cached face to the image being lower than a respective number of transformations to be applied to fit other faces of the one or more cached faces to the image; and modifying the image by stitching the particular cached face in the image to replace the subject face.

12. The system of claim 11, wherein the operation of selecting the particular cached face comprises:

based on the comparing, determining a candidate list of candidate cached faces;

assigning a score to each candidate cached face in the candidate list of candidate cached faces; and identifying the particular cached face based on the score.

13. The system of claim 12, wherein the operation of determining the candidate list includes determining the candidate cached faces of the image cache to be on the candidate list, wherein the candidate cached faces include at least one of: a similar lighting to the subject face or a similar geometric orientation to the subject face.

14. The system of claim 11, wherein the one or more processors are configured to perform further operations comprising determining that the subject face does not satisfy a quality threshold based on examination of one or more particular characteristics of the image, wherein selecting the particular cached face and stitching the particular cached face are performed in response to determining that the subject face does not satisfy the quality threshold.

15. The system of claim 14, wherein the one or more particular characteristics of the image include one or more facial attributes depicted in the subject face, the facial attributes including smiling mouth and eyes-open.

16. The system of claim 11, wherein the one or more processors are configured to perform further operations comprising assigning respective scores for one or more visual image characteristics of the subject face of the image and for one or more visual image characteristics of the one or more cached faces stored in the image cache, wherein the comparing includes comparing the scores for the subject face of the image with the scores for the one or more cached faces, wherein the operation of selecting the particular cached face is further based on the scores.

17. The system of claim 11, wherein the one or more processors are configured to perform further operations comprising:

determining whether the subject face qualifies to be stored in the image cache based on a comparison of the subject face to the one or more cached faces; and storing the subject face in the image cache if the subject face qualifies to be stored in the image cache.

18. The system of claim 11, wherein stitching the particular cached face comprises one or more of:

aligning the subject face and the particular cached face based on facial landmark points; or performing gradient domain compositing.

19. A non-transitory computer readable medium having stored thereon program instructions that, when executed by a processor, cause the processor to perform operations comprising:

identifying a subject face of an image, wherein the subject face depicts a subject;

comparing the subject face of the image with one or more cached faces stored in an image cache;

selecting a particular cached face of the one or more cached faces, wherein the selecting is based on the comparing and is based on a number of transformations to be applied to fit the particular cached face to the image being lower than a respective number of transformations to be applied to fit other faces of the one or more cached faces to the image; and modifying the image by stitching the particular cached face in the image to replace the subject face.

20. The non-transitory computer readable medium of claim 19, wherein the operation of comparing the subject face of the image with the one or more cached faces includes assigning respective scores to one or more visual image characteristics of the one or more cached faces based on comparisons of the one or more visual characteristics of the one or more cached faces with one or more corresponding visual image characteristics of the subject face, wherein the one or more visual characteristics include one or more of lighting characteristics or color characteristics, and wherein the operation of selecting the particular cached face is further based on the respective scores.

* * * * *